Figures 1, 2:
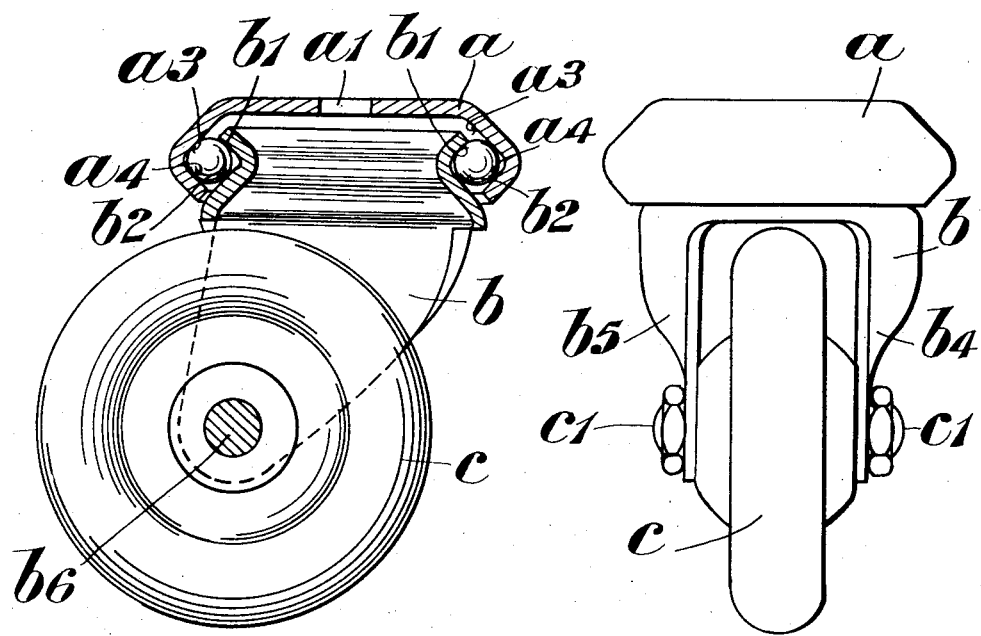

Oct. 17, 1933.  N. A. DAVIES  1,931,469
CASTER
Filed Dec. 5, 1931  2 Sheets-Sheet 1

Inventor
Norman A. Davies
By Marion & Marion.
Attorneys.

Oct. 17, 1933.  N. A. DAVIES  1,931,469
CASTER
Filed Dec. 5, 1931   2 Sheets-Sheet 2

Inventor
Norman A. Davies.
By Marion & Marion.
Attorneys.

Patented Oct. 17, 1933

1,931,469

UNITED STATES PATENT OFFICE 1,931,469

CASTER

Norman Albert Davies, Radlett, England

Application December 5, 1931, Serial No. 579,289, and in Great Britain December 19, 1930

1 Claim. (Cl. 113—117)

This invention relates to ball bearing casters, and has for its object to provide a highly efficient caster consisting of a minimum number of parts, and of greatly reduced cost of manufacture.

The improved caster has preferably a single row of balls between the fixing member and the swivelling member carrying the wheel, and these members are so designed and arranged that the row of balls transmit all the forces including both the weight of the load and the bending moment due to the caster wheel offset, between the two halves of the caster, and this permits practically frictionless operation with extreme simplicity of construction.

The present invention comprises a ball bearing caster of which the ball races are carried respectively by the fixing plate member of the caster and the swivelling member carrying the wheel, characterized in that the ball race in one member is formed complete while in the other member only a circumferential half of the race is formed before assembly, the other half being formed after the balls have been positioned between the races, by bending, flanging or spinning a portion of the member over the balls.

The present invention also comprises a method of making such casters consisting in forming the caster fixing member and the swivelling member each from a single sheet of steel or other suitable metal by cupping by all or any suitable number of processes such as stamping, pressing, drawing, spinning and punching.

The inner race of the ball bearing of the caster is made by a method which consists in making the swivelling member of the caster from a sheet of metal cut to form a central disc from the opposite sides of which extend horn members in which holes are to be formed for carrying the axle of the roller, the disc being then drawn or pressed in a die to bring the horns into position parallel to each other and to form an end cup like portion having a conical portion forming one of the inclined surfaces of the inner ball race, the other inclined surface of the race being then formed by punching out the end portion of the cup and bending, pressing or spinning the edges so formed outwards.

According to the present invention the method of making the outer race and fixing member and of fixing it on the caster relatively to the inner race, preferably consists in making such member from a circular blank of sheet metal, forming a hole in the centre of it, drawing or pressing the disc into a cup-shaped form having a conical portion forming one of the inclined surfaces of the race and from the outer edge of which extends a cylindrical portion, and after the inner and outer parts have been assembled and the balls placed in position bending, pressing or spinning the cylindrical portion over the balls to form the other inclined surface of the outer race.

Figure 3:
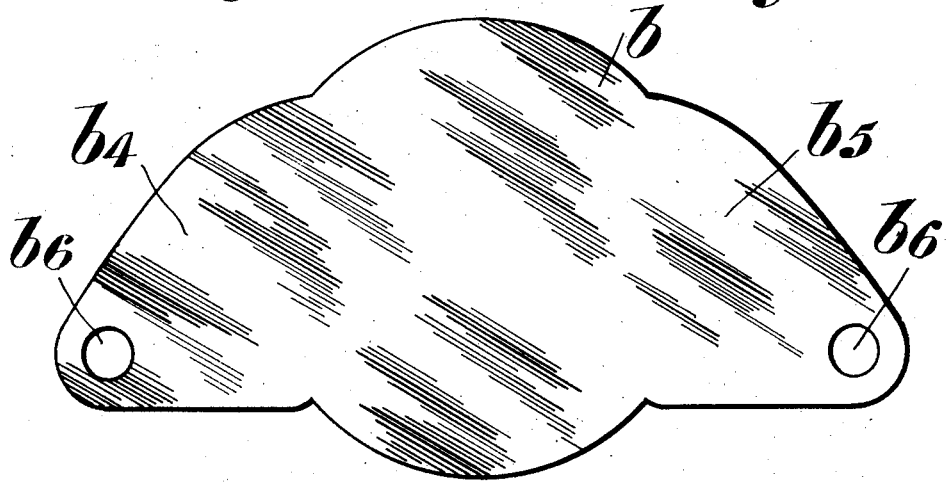
Figure 4:
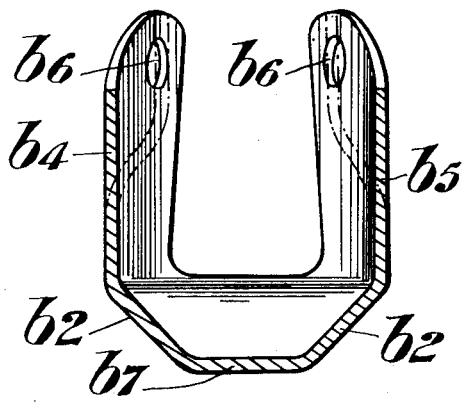
Figure 5:
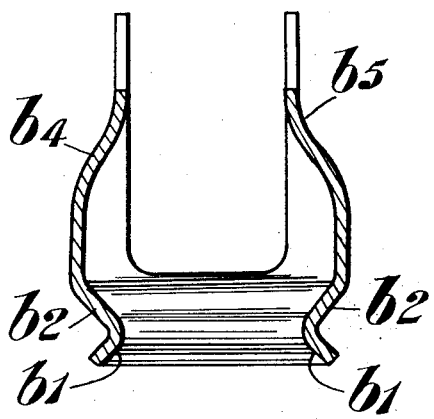
Figure 6:
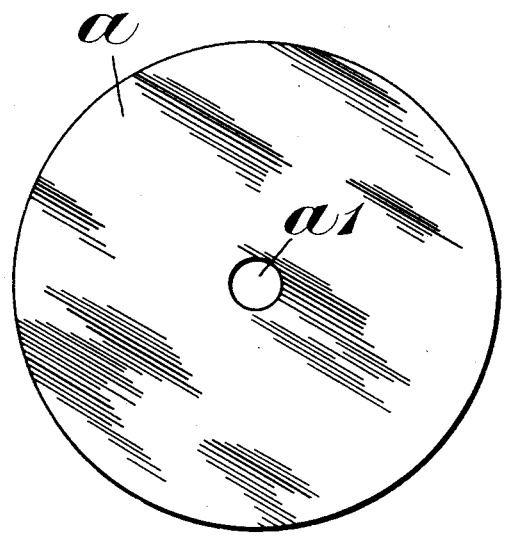
Figure 7:
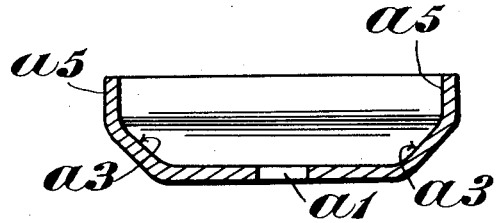
Figure 8:
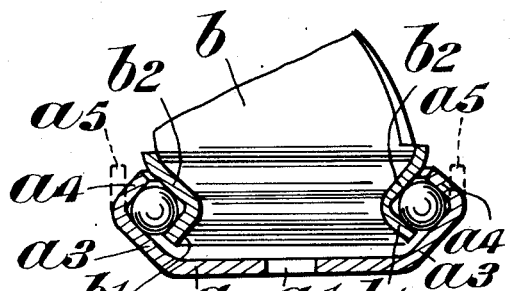

A manner of carrying out the invention is illustrated by the accompanying drawings of which Figure 1 is a vertical elevation of the complete caster, Figure 2 an outside elevation of the caster, Figures 3 to 5 illustrate stages in the manufacture of the swivelling member carrying the roller, while Figures 6 and 7 illustrate stages in the manufacture of the fixing member and Figure 8 illustrates the final stage in the manufacture of the outer ball bearing race and the final fixing of the balls in the races.

In these drawings $a$ is the fixing member of the caster having a hole $a1$ through which can be passed a fixing bolt, screw or other suitable fastening whereby the caster can be fixed to the leg of a piece of furniture or other article to be provided with casters. The outer edge of the member $a$ is shaped to form an outer ball race consisting of two inclined ball engaging surfaces $a3$ and $a4$ adapted to engage each ball at two points.

The swivelling member comprises a hollow metal body $b$ of which the upper edge is shaped to form an inner ball race consisting of two inclined ball engaging surfaces $b1$ and $b2$.

The ball engaging surfaces $a3$, $a4$, $b1$ and $b2$ are practically flat, they may however, be slightly curved to form concave ball engaging surfaces.

The lower portion of the swivelling member $b$ is shaped to form two horns $b4$ and $b5$ in the lower portions of which are drilled holes $b6$ for supporting the axle bolt $c1$ of a roller $c$.

The caster swivelling member $b$ is cut from sheet metal to form a blank of the shape shown in Figure 3 in which are drilled two holes $b6$ for the roller axle. The blank of $b$ is then stamped or pressed in suitable die to the form shown in Figure 4, thereby forming the incline $b2$ of the ball race, and bending the horns $b4$ and $b5$ into position after which the end portion $b7$ is punched out and then the edges of the hole so formed are pressed or spun out to form the incline $b1$ of the ball race, thereby completing the inner ball race.

The caster fixing member $a$ is formed from a sheet metal blank disc in the centre of which is formed the hole $a1$ for the fixing screw or bolt as shown in Figure 6. The blank so formed is then stamped or pressed in a suitable die to the form illustrated by Figure 7 thereby forming the incline $a3$ of the outer ball race. The hole $a1$ may have corners formed in it so that it can take either a bolt having a round or square section.

The two parts of the race are now placed in position, that is $b$ within $a$ as illustrated in Figure 8 and the balls placed in the grooves formed between the race surfaces $b1$ and $a3$, after which the cylindrical portion $a5$ is pressed or spun over the balls to form the race $a4$ as in Figure 1, thereby holding the balls in their races and the two members $a$ and $b$ together.

It will be noted from the above construction of caster that the races have no outlet or inlet slot or hole for the balls, and that the inner and outer races are not separable after having once been assembled.

The two horns may, if desired, be connected together by a strengthening tie or bolt passed through a tubular strut engaging at opposite sides the inner surfaces of the horns at any suitable place.

The caster may be fixed to the article to be provided with casters by one or a number of screws or rivets passed through its top portion.

The rivets or screws may be hollow and may be formed integral with the carrying or supporting member, which member may take the form of a rectangular plate for bolting on to a flat surface, or a cylinder for inserting in a cylindrical hole, or take the form of a cup. One or more holes may also be formed for attaching the caster to metal pins or bolts which in turn will pass into the article on which the casters are to be fastened and which may be secured thereto by any suitable means.

I prefer to make in the fixed portion of the caster one or more holes of a combined circular and square shape so that the caster is equally suitable for fastening on round rods or rivets and square rods or rivets, but I do not wish to limit myself to the use of square sections for this purpose as the shape of the hole may be made equally suitable for triangular or hexagonal material and the like. I may also provide washers of substantial thickness either underneath or above the flat portion of the fixed part of the caster which may be suitably secured to the same for the purpose of stiffening the thin metal which it must necessarily be made of, furthermore this top portion may be fitted with suitable projections or other means for preventing its rotation on the article to which it is fixed, and these projections may be formed by bending upwards angular shaped tongues punched in the said top portion.

What I claim and desire to secure by Letters Patent is:—

The method of making a ball bearing caster from two sheets of metal, such caster having a fixing member carrying by a vertical axis ball bearing a swivelling member which carries the wheel of the caster, consisting in forming the swivelling member of the caster from a single sheet of metal by shaping the metal to form a portion from which roller carrying horns are formed such portions extending from a central portion from which the inner race of the ball bearing is formed, then cupping the plate to form one inclined member to form one side of the ball race, cutting out the end of the cup and bending its edges outwards to form the other inclined member of the inner ball race, opening out the horn members to form parallel supports for the axle of the roller, then forming the outer member of the ball race by forming a disk of metal into a cup having an inclined portion which forms one inclined member of the outer ball race and a top portion which forms the fixing member of the caster, then after placing the balls in position bending inwards the edge of the cup over the balls to complete the ball race and hold the balls in position.

NORMAN ALBERT DAVIES.